April 23, 1968

W. G. MOEHLENPAH ETAL 3,379,354

APPARATUS FOR FABRICATING WOOD STRUCTURES

Filed Oct. 18, 1965

Walter G. Moehlenpah,
George E. Pallme, Jr.
Inventors
Koenig, Senniger, Powers and Leavitt
Attorneys

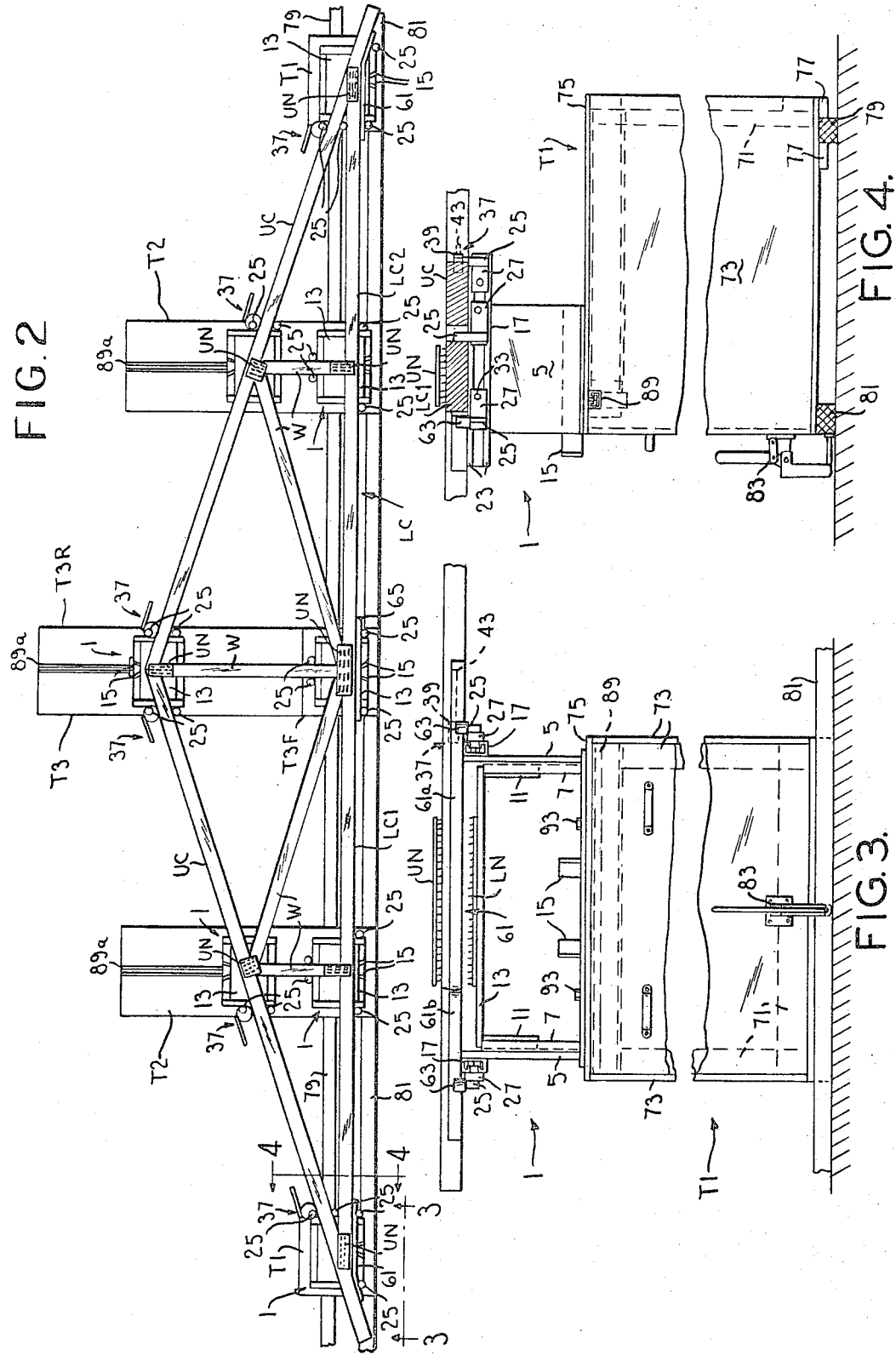

April 23, 1968    W. G. MOEHLENPAH ETAL    3,379,354
APPARATUS FOR FABRICATING WOOD STRUCTURES
Filed Oct. 18, 1965    5 Sheets-Sheet 3

April 23, 1968    W. G. MOEHLENPAH ET AL    3,379,354
APPARATUS FOR FABRICATING WOOD STRUCTURES
Filed Oct. 18, 1965    5 Sheets-Sheet 4

April 23, 1968   W. G. MOEHLENPAH ET AL   3,379,354
APPARATUS FOR FABRICATING WOOD STRUCTURES
Filed Oct. 18, 1965   5 Sheets-Sheet 5

United States Patent Office 3,379,354
Patented Apr. 23, 1968

3,379,354
APPARATUS FOR FABRICATING
WOOD STRUCTURES
Walter G. Moehlenpah, Ladue, and George E. Pallme,
Jr., St. Louis County, Mo., assignors to Hydro-Air
Engineering, Inc., St. Louis, Mo., a corporation of
Missouri
Filed Oct. 18, 1965, Ser. No. 496,942
28 Claims. (Cl. 227—152)

ABSTRACT OF THE DISCLOSURE

Apparatus for fabricating wood structures, such as roof trusses, comprises a plurality of substantially identical units mounted on table structure. Channels on the units mount fixtures for locating the truss members relative to the various units and for holding them in place during fabrication operations. Each unit has a movable locator tray which holds a toothed nailing plate beneath the intersection of two truss members. A portable press is moved from unit to unit for driving the nailing plates which are supported by the trays into the truss members.

---

Wood roof trusses are widely used in residential and commercial building structures. Various types or configurations of trusses are used including the Howe truss, the so-called W or Fink truss, etc. Typical roof trusses have lower chords joined at the ends to upper chords, the upper chords being connected together at the peak of the truss. A plurality of web members constituting compression members may be positioned between the upper and lower chords and attached thereto.

This invention is concerned with apparatus for fabricating wood trusses, such as trusses used for roof constructions, a portion of the apparatus functioning as a jig on which precut chord and web members may be assembled and secured together by nailing plates or the like. Apparatus of this type have been commercially available but, due to their relatively high cost, they have not been economical for installation by truss manufacturers (such as a small lumber dealer) having a low volume production. Also, previous truss fabricating apparatus included, as an integral part of the apparatus, supports or pedestals for holding the portion of the apparatus constituting the jig at a convenient working height, thus increasing shipping weight and the cost of the apparatus. In many instances, integral tables or supports are not needed by the truss manufacturers since similar supports may be readily fabricated by him, particularly if he is a lumber dealer.

Accordingly, among the several objects of the invention may be noted the provision of apparatus for fabricating wood structures which can be priced for economical production of small quantities of trusses; the provision of apparatus for fabricating wood trusses in which inexpensive supports for the apparatus may be fabricated by the purchaser; the provision of improved wood truss manufacuring apparatus in which heavy permanent supporting structure for the apparatus has been eliminated; the provision of apparatus for fabricating wood trusses or the like having improved means for locating chord and web members on the apparatus and holding them in place during fabrication of the truss; the provision of improved apparatus for fabricating wood structures including a hydraulic press or the like having improved and inexpensive means for moving the press from one location to another during manufacture of a truss; the provision of apparatus for fabricating wood trusses having improved means for adjusting units of the apparatus relative to their supports to accurately locate the units at the juncture of chord and/or web members; and the provision of apparatus for fabricating wood structures using a plurality of units which can be provided in various numbers and arrangements on a surface for fabricating different types or sizes of trusses or other wood structures from pieces of lumber and nailing plates. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

FIG. 2 is a plan of the FIG. 1 apparatus, the hydraulic portion o fthe apparatus being omitted;

FIG. 3 is an enlarged fragmentary elevation taken along line 3—3 of FIG. 2;

FIG. 4 is an enlarged fragmentary elevation taken along line 4—4 of FIG. 2;

Corresponding reference characters indicate corresponding parts throughout the several views of the drawings.

Figure 1:
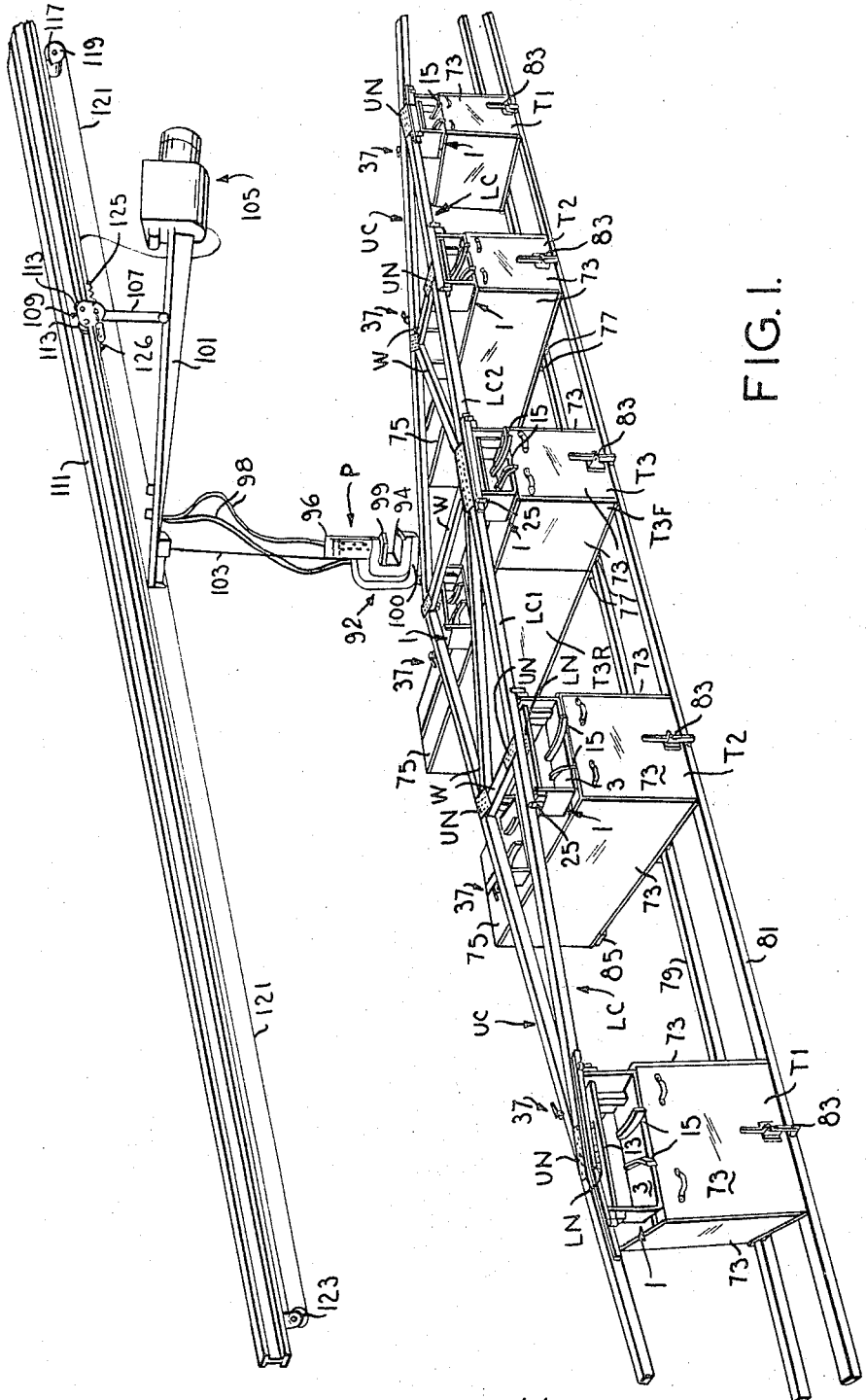
FIG. 1 is a perspective of apparatus for fabrication of wood trusses in accordance with the invention, and showing fabrication of a Howe truss.

Referring to the drawings, apparatus for fabricating wood trusses is shown to comprise a plurality of substantially identical units generally designated 1. Units 1 are supported at a convenient working height by table structure shown in FIGS. 1–9 as a plurality of tables T1, T2 and T3, the tables being of various sizes but being similar to each other in other respects. Units 1 and tables T1, T2 and T3 comprise a jig for holding elements of a wood structure, the wood structure illustrated being a roof truss having upper chords UC, a lower chord LC consisting of two pieces of wood LC1 and LC2, and a plurality of web members W between the upper and lower chords. Units 1 are preferably arranged on the table structure to be beneath the intersections of the chords and the intersection of the web members and the chords. For example, FIG. 2 shows one of the units 1 at the intersection of the two upper chords UC (called the peak of the truss), other units 1 at the intersections of upper chords UC and the lower chords LC (the heels of the truss), another unit 1 where the two parts LC1 and LC2 forming the lower chord are spliced together, and other units 1 at the intersections of web members W with the upper and lower chords intermediate the lengths of the upper and lower chords (called upper and lower panel points). Units 1 are adapted to hold lower nailing plates L beneath the intersections of the truss members and upon nailing plates UN are placed above and rest on the intersections of the truss members. These plates are flat plates from which a plurality of nail like projections have been struck. The nailing plates LN and UN are then driven into the truss members by a press generally designated P.

Figure 5:
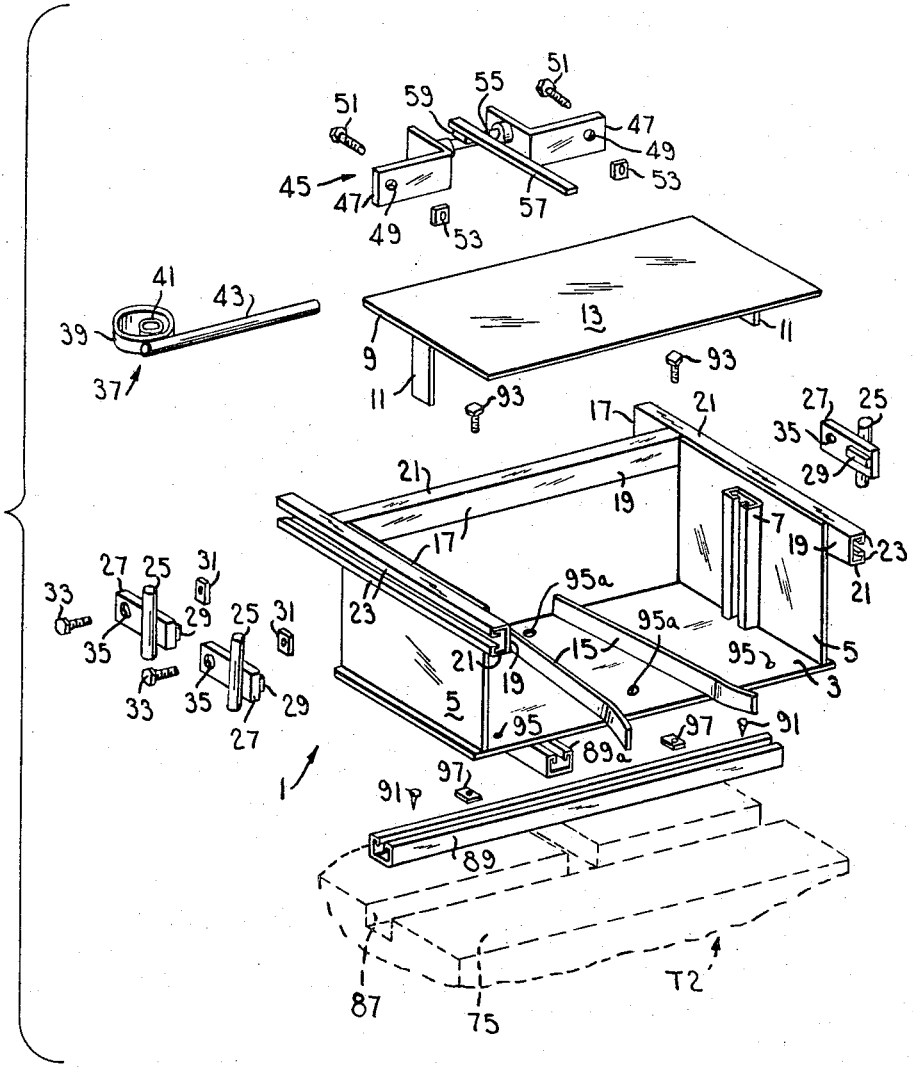
FIG. 5 is an exploded view of one of the units.

Referring to FIG. 5, each unit 1 is shown to comprise a bottom plate 3 and upwardly extending walls 5 at two edges of bottom plate 3. Plate 3 can be integral with walls 5 and guides 7 or the plate, guides and walls can be separately formed and secured together by any suitable means. Unit 1 is open at the other edge of plate 3. A guide 7 (consisting of a channel having flanges partially closing its open side) is secured to the inner surface of one of the walls 5. A similar channel or guide (not shown) is secured to the inner surface of the opposite side wall 5. A locator tray 9 has downwardly projecting bars 11 which slide in guides 7. Locator tray 9 is biased downwardly by gravity and may be vertically lifted by press P relative to the bottom plate 3 due to the sliding connection between the bars 11 and guides 7. The upper surface 13 of tray 9 is located in a substantially horizontal plane and locator strips (not shown) may be provided on surface 13 for accurately locating the lower nailing plates LN on this surface. Tray 9 moves upwardly with the nailing plate as the nailing plate is driven into the truss members. The lower portion of press P is received between the side walls 5 beneath tray 9 and above bottom wall 3 for elevating tray 9. The press P is guided into unit 1 by guide rails 15 secured to the upper surface of bottom plate 3. Rails 15 converge toward each other as they approach the wall 5 of the unit 1 opposite from the open side of the unit.

Secured to the upper portion of side walls 5 are three channels 17. Each of the channels has a base 19 attached to the outer surface of walls 5 and upper and lower sides 21 which project outwardly away from walls 5. At the outer end of channel sides 21 there are inwardly projecting flanges designated 23 which partially close the open side of the channels. The upper side 21 of each channel 17 is above the plane of locator tray surface 13 when the locator is at its lowered position and the truss members rest on the upper channel sides 21 during fabrication of the truss.

The truss members need to be accurately located and securely held in position on the units 1 during fabrication of the truss. For this purpose a plurality of pins 25 are provided. Each pin 25 has a center portion secured to one surface of a mounting plate 27. On the opposite surface of each plate 27 there is a short, narrow rib 29 which is sized to fit between the flanges 23 of channels 17. With rib 29 positioned in one of the channels, a nut 31 is placed in the channel and a bolt 33 passed through a hole 35 in plate 27 and threaded into the nut 31. Nuts 31 are larger than the space between the flanges 23 of the channels 17 so that they will not pass through or between the flanges 23. Nuts 31 are sized so they cannot turn when the bolts 33 are tightened. Thus on tightening of bolts 33 the plates 27 and pins 25 are clamped to the channels 17. Pins 25 may be adjusted to any position along a channel 17 by loosening the bolts 33 and moving the pins to the desired location. The ends of pins 25 project from both sides of the plate 27 and the upper end extends above the upper side 21 of channels 17. Plate 27 may be reversed so that either end of pins 25 may project above the channels. This permits the plates to be used at either end of any of the channels. The truss members rest on the upper sides 21 of channels 17 during fabrication of a truss and the pins 25 form locators or abutments against which the truss members may be held. While three of the pins 25 are shown with the unit 1 in FIG. 5, it will be understood that the number of these units may be varied as required for the particular truss being assembled.

Some of the pins 25 may be used in connection with clamp structure generally designated 37 for clamping a truss member between the clamp and one of the pins. As shown in FIG. 5, clamp 37 comprises an outer relatively large tubular member 39 having eccentrically secured to its inner surface an inner relatively small tubular member 41. The axes of members 39 and 41 are parallel and spaced from each other so that rotation of member 39 about the axis of member 41 causes eccentric movement of member 39. A clamp handle 43 is attached to the outer surface of member 39. Inner member 41 receives the upper portion of one of the pins 25 for mounting the clamp on unit 1. With clamp 37 positioned on a pin 25, the handle 43 can be swung to move the outer surface of member 39 in an eccentric path about the inner member 41. It will thus be seen that a truss member located between one pin 25 on a channel 17 and clamp structure 37 can be tightly gripped therebetween by manipulation of the clamp structure. This relatively simple clamp structure permits quick and easy clamping and release of the truss members on the apparatus.

Locator structure generally designated 45 in FIG. 5 may be used for locating the end of a truss member on the apparatus. The locator structure 45 comprises two angle shape brackets 47 having holes 49 therethrough so that the brackets can be bolted to channels 17 by bolts 51 and nuts 53 in the same manner the plates 27 are attached to and adjustable along channel 17. Brackets 47 are spaced from each other and extending between them is a shaft 55. A locator bar 57 has an end attached to the shaft 55 by a block or spacer 59 so that the bar 57 is adapted to be swung about the axis of shaft 55.

In using locator structure 45, it is adjusted along a channel 17 so that one edge of the bar 57 is located at the place where an end of one of the upper chords is to be positioned in manufacturing a truss. For example, the left edge of bar 57 could be located at the place where the right end of the upper chord shown at the left side of FIG. 2 is to be located. This upper chord is laid in position on the apparatus with its right end abutting the left edge of bar 57 to initially locate this upper chord. Locator bar 57 is then swung upwardly about the axis of shaft 55 away from the upper chord. The other upper chord is positioned at the truss peak by placing its upper end in abutting engagement with the end of the upper chord first located on the apparatus. The locator structure 45 can also be used in other locations such as, for example, at the lower center portion of the lower chord where the two pieces of wood defining the lower chord are spliced together.

Figure 6:
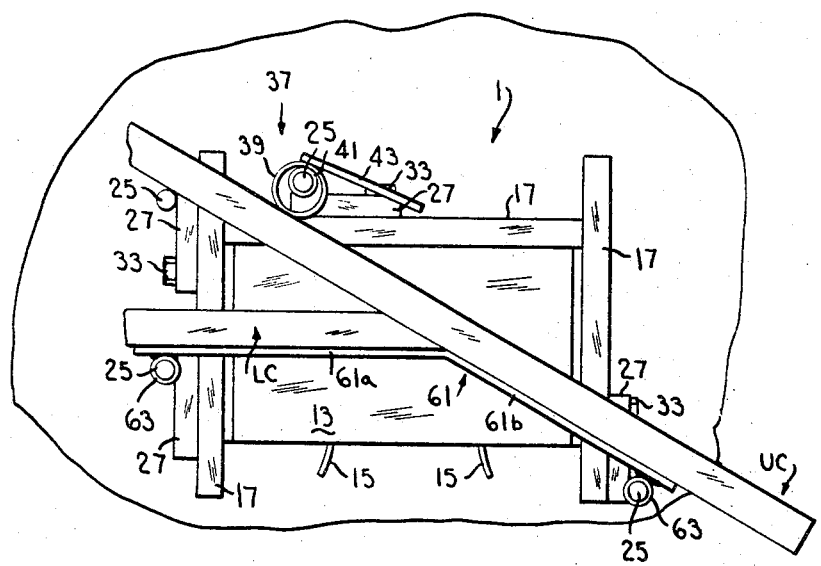
FIG. 6 is a fragmentary plan showing the apparatus clamping the heel of a truss.
Figure 7:
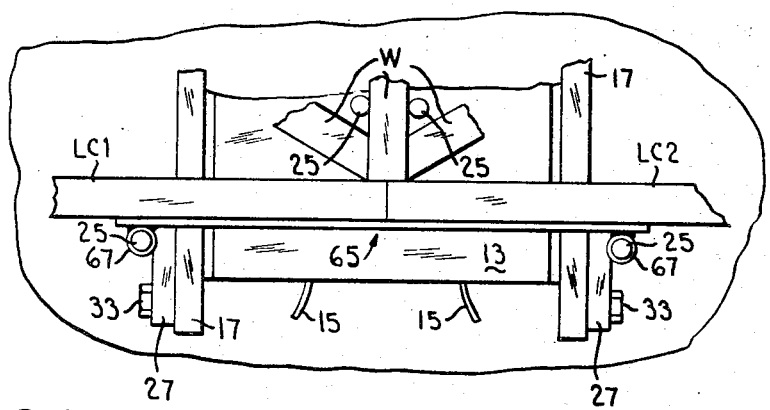
FIG. 7 is a fragmentary plan showing chord and web members clamped at the center of the lower chord.

Other structure for locating truss members is illustrated in FIGS. 6 and 7 of the drawings. FIG. 6 illustrates a locator for the upper chords and lower chords at the heel of the truss. The locator comprises an elongate bar 61 having end portions 61a and 61b at an angle relative to each other. At the ends of bar 61 sleeves or collars 63 are secured to one surface of the bar for receiving the projecting ends of two pins 25 on opposite sides of a unit 1. As shown in FIG. 6, the lower chord LC has its lower side aligned along the portion 61a of bar 61 and the upper chord UC has its lower side aligned along the portion 61b of the bar 61. The end of lower chord LC is in abutting engagement with the lower side of the upper chord UC and the nailing plates LN and UN (not shown) are placed below and above the intersection of these two chords for fastening the chords together. Locators with end portion 61a, 61b at different angles relative to each other may be provided for different sizes or types of trusses.

Another locator bar generally designated 65 in FIG. 7 has sleeves or collars 67 attached to one surface of its end portions. Bar 65 is substantially straight throughout its length and is adapted to be mounted on pins 25 at the unit 1 located at the center of the lower chord LC. Bar 65 provides means for aligning sides of the wood members LC1 and LC2 of the lower chord while they are spliced together.

Referring now to FIGS. 1–4, each of the table structures shown comprises a wooden frame 71 which is covered by a suitable material, such as plywood as shown at 73. Each table structure has a generally flat, horizontal upper surface 75 on which units 1 are mounted as explained later. At the rear portion of tables T1 and at an intermediate portion of the other tables there are two spaced wooden members 77 secured to the bottom of the table structure defining therebetween a channel which receives the rear one of a pair of parallel rails 79, 81. The front rail 81 is positioned beneath the front edge portion of the table structures. On the front of each table structure is a clamp 83 for clamping the tables to the rails at various positions along the rails. Rails 79 and 81 are shown as pieces of two-by-four lumber which are secured to the floor of the structure housing the truss fabricating apparatus. Table structures T2 and T3 may be provided with feet or pads 85 (FIG. 1) at the rear of the table to support the table at the end opposite from rails 79 and 81 while the table is stationary or being moved along the rails.

Referring to FIG. 5, the upper surface 75 of table T2 has a groove 87 extending from one side to the other side of the table. Groove 87 receives an elongate channel 89 which is similar in shape to the channels 17 of units 1. Channel 89 may be secured to tables T1 by screws 91. Bolts 93 pass through holes 95 in bottom plate 3 of a unit 1 and into nuts 97 in the channels 89 for mounting the unit on the table. By loosening bolts 93 the unit 1 can be laterally moved to various positions along the length of channel 89 thereby to vary the location at which the nailing plates are driven into the truss members for any given location of the tables on the rails 79 and 81. Precise positioning can be obtained in this manner. Where major lateral adjustment is required (such as where a new size or type of truss is to be fabricated), then the tables are moved along the rails.

Since only one unit 1 is mounted on tables T1, there is normally only one channel 89 provided and it extends generally parallel to the rails 79 and 81. For tables T2 and T3, however, there are at least two units 1 mounted on these tables. The lower one of these units (as viewed in FIG. 2) may need to be adjusted laterally (parallel to the rails 79, 81) and for this reason a channel similar to that shown at 89 is provided at the lower end of tables T2, T3 for the lower unit 1 on these tables. On the other hand, the upper unit 1 for each of the tables T2 and T3 may need adjustment longitudinally along the table, and for this purpose channels 89a are provided on the tables T2 and T3. Holes 95a between the guides 15 on bottom plate 3 receive bolts for mounting the upper units 1 in channels 89a. Channels 89a are substantially perpendicular to channels 89.

The center table T3 is substantially longer than the other tables and may be six-to-eight feet long, for example. For this reason, it may be made in sections and held together by any suitable means. As illustrated in FIG. 1, table T3 comprises a front portion T3F similar in size to table T1 and a rear portion T3R which forms an extension of the table portion T3F.

The hydraulic press P shown in FIG. 1 comprises a generally C shaped frame 92 which has a relatively flat surface 94 constituting the lower platen of the press. Press P includes a hydraulic power unit 96 to which hydraulic fluid lines 98 are connected for providing hydraulic fluid under pressure to move upper platen 99 toward and away from the lower platen 94. On the bottom of the C shaped frame 92 beneath platen 94 there is a rib 100 which is received between the guides 15 on the bottom plate 3 of units 1 for guiding the press P into positon for driving the nailing plates into the truss members. The upper platen 99 is placed over the upper nailing plates UN and the lower platen is placed beneath the tray 9.

Figure 8:
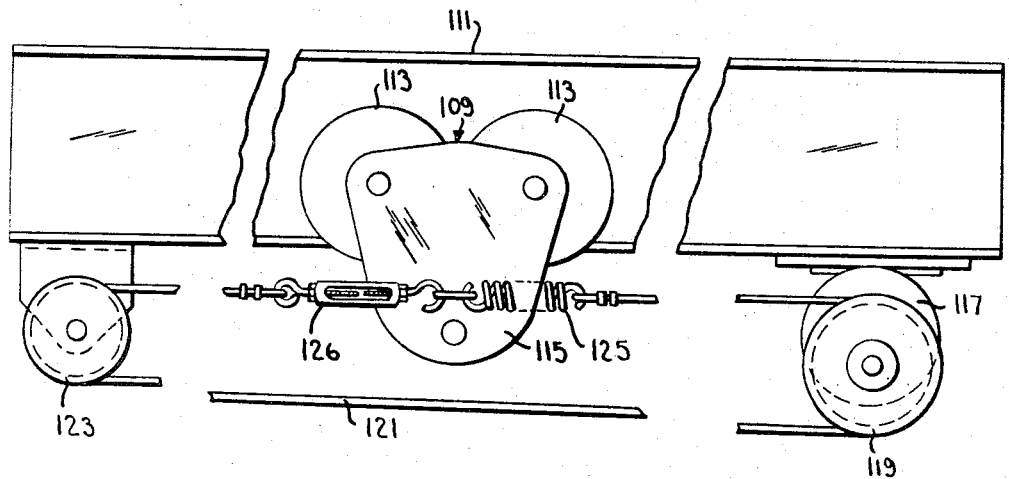
FIG. 8 is an enlarged fragmentary elevation of the drive shown in FIG. 1 for moving the hydraulic press.

The hydraulic press P is supported on one end of a boom 101 by a cable 103. Boom 101 is counterbalanced by a hydraulic pump and motor assembly generally designated 105 mounted at the other end of the boom. A hanger 107 suspends boom 101 from a carirage 109. The hanger and boom permit universal movement of the press. Carriage 109 is movable along an I beam or track designated 111. Referring to FIG. 8, carriage 109 has wheels 113 which ride along the beam 111. Attached to wheels 113 is a bracket 115 to which the hanger 107 is attached. On the right end of beam 111 there is a reversible electric motor 117 which drives a pulley 119. A cable 121 is trained around pulley 119 and an idler pulley 123 at the left end of beam 111. The ends of cable 121 are connected to bracket 115 by a spring 125 and a turnbuckle 126. When motor 117 drives pulley 119 the cable 121 is moved, thereby moving carrier 109 along beam 111. This in turn moves the hydraulic press P for travel between units 1. The controls for operation of the electric motor 117 may be conveniently located on the body 92 of the press P.

Operation of the apparatus is as follows:

Units 1 are attached to table structures T1-T3 as previously described. Then the table structures are moved along rails 79, 81 to the desired locations corresponding to the particular type and size truss to be fabricated. For fabricating trusses of the particular type shown in FIGS. 1 and 2, the center table T3 is moved along rails 79, 81 until it is located substantially at the center of the truss to be fabricated, and it is then clamped to rail 81. In a similar manner tables T1 are located at the heel portions of the truss immediately beneath the area in which the lower chords LC are attached to the upper chords UC. The other two tables T2 are similarly located between table structures T1 and T3 where intermediate web members W are to be attached to the upper chords UC and lower chords LC. The table structures T2 and T3 are located so that the channels 89a are beneath the place where the upper chords are intersected by the web members. The units 1 maybe adjusted along channels 89 and 89a on the table structures to accurately position each unit 1 at the desired location relative to the juncture of truss members. Units 1 are then clamped in place on the tables T1-T3 by tightening the bolts 93.

The apparatus is particularly useful for mass production of a large number of trusses of the same size and type whereby the individual truss members are precut before fabrication of the truss begins. The precut upper and lower chord members are located on the units 1 using the peak locator structure 45, the locator bars 61 and 65, the pins 25 and clamp structures 37. The locator bar structure 45 is used as previously described for locating one end of one of the upper chords UC and the locator bar is then swung away from the truss member. The upper chord member is held in place by clamping it between one or more of the pins 25 and clamps 37. The other upper chord is then located by first placing its upper end against the upper end of the upper chord first located in place, and then placing its other end along the locator bar structure 61b. Pins 25 and clamps 37 hold the other upper chord in this position. The lower chord is then assembled by placing the chord portions LC1 and LC2 in abutting engagement at the center of the truss and against the inner surface of the locator bar 65. The outer ends of the lower chord members LC1 and LC2 are placed along the inner surface of the bar 61 as shown in FIG. 6. The ends of the lower chords abut the sides of upper chords UC. The web members W are then located between the upper and lower chords and clamped in place by the pins 25, clamps 37 or combinations thereof. While FIGS. 1–9 illustrate one manner of fixing the truss members in position on the apparatus by a particular arrangement of the pins 25, clamps 37 and other locator structure, it will be understood that these may be varied to suit the particular operation and the particular type and size of truss being manufactured.

The lower nailing plates LN are placed on the upper surface of the locator tray 9 of each unit 1 either before or after the truss members are clamped in place. The upper nailing plates UN are placed over the intersection of the truss members after the latter have been clamped in place. The press P is then moved from one of the units 1 to the other of the units 1 for driving the nailing plates. At each unit 1 the rib 100 of the press P, with platen surfaces 94 and 99 separated, is moved between the two guides 15 so as to place the lower platen 94 immediately beneath the bottom surface of the tray 9 and to place the upper platen 99 immediately above the upper nailing platen UN. Hydraulic fluid is then provided to cylinder 96 through hydraulic lines 98 to drive platen 99 toward platen 94. As the platens move toward each other they contact the nailing plates UN and the locator trays 9 to force the projecting nail like portions of the nailing plates LN and UN into the wood members of the truss, thereby nailing the truss members together. After all of the nailing plates have been driven in the truss members, the completed truss is removed from the apparatus by loosening the clamps 37 and swinging the truss upwardly onto the lower chord LC for removal either manually or by powered apparatus not shown.

The apparatus can be rapidly adjusted for making different sizes or types of trusses simply by unclamping the tables T1–T3 from the rails 81, sliding the tables along the rails to new positions and clamping them in place, and then adjusting the units 1 along the tables. Some adjustment of the pins, clamps and locator members on each unit 1 may also be required.

Figure 9:
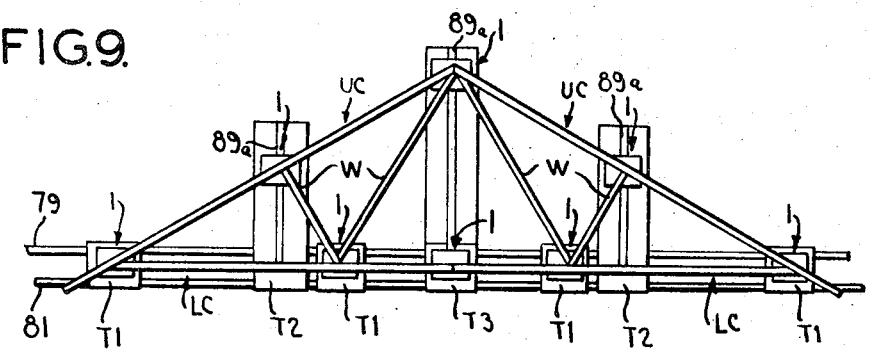
FIG. 9 is a plan on a smaller scale showing fabrication of a Fink truss by additions to the FIGS. 1–8 apparatus.

FIG. 9 of the drawings illustrates apparatus of the invention used for forming a different type of truss, such being a so-called Fink truss. This apparatus is the same in all respects as the one previously described except that two additional table structures T1 have been provided and are located between the table structures T2 and T3. These additional tables T1 are required since there are positions along the lower chord LC where web members W are attached to the lower chord which are so far out of line with positions where the web members are attached to the upper chords that the units 1 for these two positions cannot be mounted on a single table structure. Rather than making the table structures T2 wider, two additional table structures T1 are provided. It will thus be apparent that the arrangement and number of tables T1–T3 provided for any particular truss will depend upon the size and type of truss being manufactured.

Figure 10:
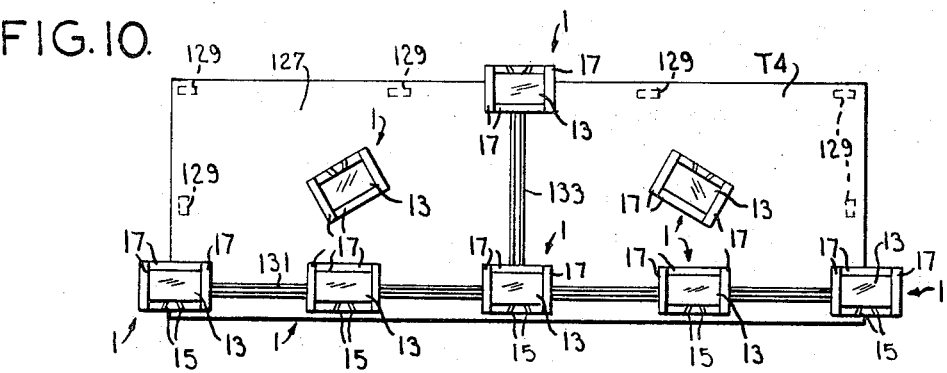
FIG. 10 is a plan of a modified form of the apparatus.

FIG. 10 of the drawings illustrates a modified form of the invention in which there is a single table structure designated T4 on which all of the units 1 are mounted. Table T4 has an upper generally horizontal surface 127 which is supported in a generally horizontal plane at a convenient work height by legs or other suitable structure designated 129. On table surface 127 there are two channels 131 and 133 which are generally perpendicular to each other, the channel 131 being at the lower portion of the table surface 127 and corresponding generally to channel 89 on a table T1 while channel 133 generally corresponds to the channel 89a on the table structure T3. Five units 1 are shown mounted along the channel 131 (one unit 1 being at the intersection of channels 131 and 133) and one unit 1 is shown mounted on the channel 133. Each of these units is adjustable along the channels. Two additional units 1 are spaced between the outermost units 1 at the bottom and at the top of the table top and these units are attached directly to the table surface by doubleheaded nails, etc. The arrangement of the units 1 shown in FIG. 10 is similar to that shown in FIG. 1 and can be varied for fabricating different types or sizes of trusses.

Figures 11, 12:
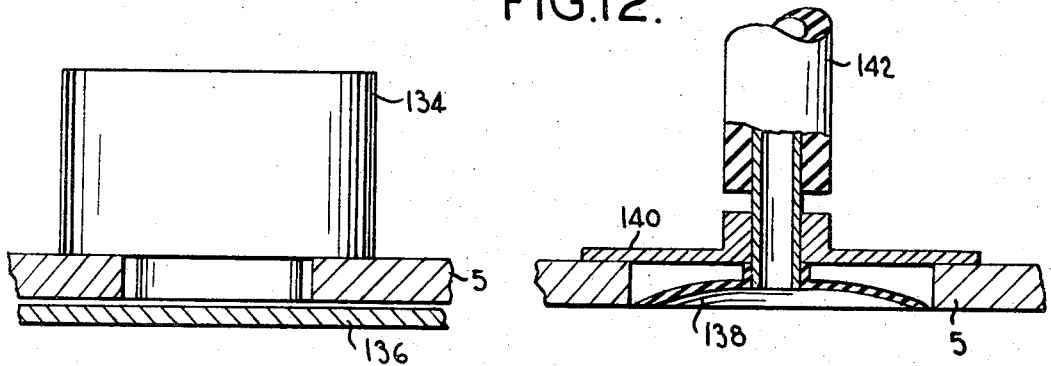
FIGS. 11 and 12 are enlarged fragmentary sections through the bottom of a unit showing other means for fastening the unit to a supporting surface.

The units 1 may be provided in any desired number and arranged in any manner on virtually any flat surface for fabricating not only trusses of various sizes and styles but other wood structures which can be assembled with nailing plates. For example, units 1 can be arranged in two parallel rows and used to form floor joists consisting of two parallel members and web members extending therebetween. This versatility is due, in part, to the fact that the units 1 may be attached to a table, the floor or any other supporting surface in the desired arrangement simply by driving double-headed nails through the holes 95 and 95a in plate 3 of the units. The units 1 can also be attached by magnets 134 (permanent or electric) which project through a hole in bottom 5 and are attracted to a metal surface 136 as shown in FIG. 11. They may also be attached by suction cups 138 (FIG. 12) attached to bottom 5 of the units 1 by a bracket 140. A hose 142 can connect the cups 138 to a vacuum pump (not shown). With other apparatus for fabricating wood structures, the construction of the pedestals or units and their mounting on a support limits arrangement of the units and their use.

The various table structures T1–T4 are simple to construct and may be manufactured by the purchaser of the apparatus. Thus the truss fabricator need only purchase a plurality of the units 1 and suitable hydraulic apparatus for driving the nailing plates LN and UN. This substantially reduces the equipment cost and also reduces shipping costs. Furthermore, these apparatus may be purchased by fabricators who have the equipment and materials necessary to fabricate the table structures T1–T4. Thus the apparatus can be sold for less than apparatus which have base structures forming an integral part of the apparatus. The lower cost of the apparatus of the invention makes it economical to fabricate trusses in low quantity production runs. And, of course, the apparatus of the invention is also suitable for high quantity production of trusses where even greater savings can be realized. Units such as shown at 1 cost less than one-third the cost of larger pedestals required with some prior apparatus. This not only makes the apparatus suitable for low production runs but also makes it feasible for use in building other wood structures (such as floor trusses) which may require so many units 1 that it would be uneconomical to use the more expensive pedestals of the heavier type.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A unit for use in apparatus for fabricating wood trusses as a means for locating members of a truss and also for locating nailing plates to be driven upwardly into truss members at intersections thereof, said unit comprising a plate at the bottom of the unit engageable with an elevated supporting surface for supporting the unit on the surface, the bottom plate being adapted to be quickly attached to and removed from the supporting surface in a substantially infinite number of angular positions about a vertical axis through the unit thereby permitting location of the unit in any of various positions required for fabrication of a wide variety of wood trusses, short side plates extending upwardly from the sides of the bottom plate, the height of the side plates being not substantially greater than the length of the bottom plate, a vertically movable locator tray having an upper surface substantially in a horizontal plane for holding a nailing plate in position to be driven upwardly into the intersection of truss members positioned thereabove, means for guiding the locator tray during vertical movement of the tray and nailing plates relative to the unit side plates and bottom plate, the tray being spaced a short distance from the bottom plate when the tray is lowered relative to the side plates, said unit having second guide means for guiding a lower jaw of a press between the bottom plate and the tray, means near the upper ends of the side plates for locating a truss member above the tray, and means for adjustably mounting the locating means on the side plates of the unit, the total height of the unit being substantially less than required for fabricating a truss at a convenient height above the floor for a workman.

2. A unit as set forth in claim 1 wherein the bottom plate has a plurality of holes adapted to receive nails or the like for attaching the unit to the supporting surface at a substantially infinite number of angular positions about a vertical axis.

3. Apparatus for fabricating wood trusses comprising, table structure providing a supporting surface elevated above the floor, a plurality of units mounted on said horizontal supporting surface of said table structure for locating members of a truss and also for locating nailing plates to be driven upwardly into truss members at intersections thereof, said units being of substantially identical construction and each comprising a bottom plate for mounting the unit on the supporting surface and side plates extending upward from the sides of the bottom plates, the height of the side plates of each unit being not substantially greater than the length of the bottom plate of the unit, a vertically movable locator tray with each unit having an upper surface substantially in a horizontal plane for holding a nailing plate in position to be driven upwardly into the intersection of truss members positioned thereabove, means for guiding each locator tray for vertical movement of the tray and nailing plates relative to the unit side plates and bottom plate, the tray of each unit being spaced a short distance from the bottom plate of the unit when the tray is lowered relative to the unit side plates, each unit having means for guiding a lower jaw of a press between the unit bottom plate and the tray thereabove, means near the upper end of the side plates of each unit for locating a truss member above the locator tray of the unit, means for adjustably mounting the locating means on the side plates of each unit, and the total height of each unit being substantially less than required for fabricating a truss at a convenient height above the floor for a workman.

4. Apparatus for fabricating wood trusses as set forth in claim 3 wherein the bottom plate of each unit has a plurality of holes for receiving nails or the like whereby the units are quickly attachable to and detachable from the supporting surface and the units are each positionable in a substantially infinite number of angular positions about a vertical axis through the units thereby permitting location of the units in any of various positions required for fabrication of a wide variety of wood trusses.

5. Apparatus for fabricating wood trusses as set forth in claim 3 wherein the table structure comprises a plurality of spaced tables each having a top surface in a horizontal plane on which the units are mounted, a channel on each table top surface opening upwardly, and fasteners adjustably attaching the unit bottom plates to the table channels.

6. Apparatus for fabricating wood trusses as set forth in claim 5 wherein some of said tables are elongate and have two channels on their top surfaces whereby a unit can be mounted for adjustment along each of the channels, the channels on each of said elongate tables being substantially perpendicular to each other with one of said channels extending substantially longitudinally along the tables.

7. Apparatus for fabricating wood trusses as set forth in claim 5 wherein each of the table channels have flanges projecting inwardly from their sides, and the fasteners for attaching the unit bottom plates to the tables each comprise a bolt having its shank passing through the unit bottom plate into one of the table channels and a nut in the table channel threaded on the bolt, the channel flanges retaining the nut in the channel.

8. Apparatus for fabricating wood trusses as set forth in claim 5 further comprising a pair of spaced generally parallel rails positioned beneath a plurality of said tables, means on the bottom of said tables defining a channel in which one of said rails is received for adjustment of said tables along said rails for manufacturing various types and sizes of trusses.

9. Apparatus for fabricating wood trusses as set forth in claim 8 further comprising clamps on said tables for holding said tables at a given location along said rails.

10. Apparatus for fabricating wood trusses as set forth in claim 3 wherein the means for locating truss members relative to the units comprises a plurality of pins for mounting on said unit channels with an end of the pins projecting above the plane of said locating tray.

11. Apparatus for fabricating wood trusses as set forth in claim 10 further comprising a clamp for engaging a truss member and holding it in place during fabrication of the truss, the clamp comprising inner and outer tubular members, the inner tubular member being substantially smaller in diameter than the outer tubular member and eccentrically secured to the inner surface of the outer tubular member, and a handle secured to the outer tubular member, the inner tubular member being mountable on one of said pins and movable about its axis to cause eccentric movement of the outer tubular member relative to its axis.

12. Apparatus comprising table structure providing a supporting surface in a horizontal plane spaced a convenient height for a workman above the floor, a plurality of units mounted on said horizontal supporting surface of said table structure for locating the members of a truss and also for locating nailing plates to be driven upward into truss members at intersections thereof, said units being of substantially identical construction and each comprising a bottom plate for mounting the unit on the supporting surface and side plates extending upward from the sides of the bottom plate, each unit having guides attached to the inner surfaces of the side plates, a locator tray with each unit having an upper surface substantially in a horizontal plane for holding a nailing plate in positon to be driven into the intersection of truss members positioned thereabove, each locator tray having a sliding connection with the guides of its unit for vertical movement of the tray and nailing plates relative to the unit bottom plate, and each unit having three channels at the upper ends of the side plates, said channels opening outwardly to the sides of the units and having their upper sides positioned above the plane of the locator tray upper surface for supporting truss members above the locator tray, means attached to said channels for locating a truss member relative to the unit, the table structure comprising a single table having on its top surface two channels which are substantially perpendicular to each other, fasteners adjustably mounting certain of the unit bottom plates on the channels on said table top, and other of said unit bottom plates being removably attached directly to said table top surface.

13. Apparatus for fabricating wood trusses as set forth in claim 12 wherein units located at the peak and heels of the truss are adjustable along said table channels and the units located at the intersection of web members with the upper chords are attached directly to said table top.

14. Apparatus comprising table structure providing a supporting surface in a horizontal plane spaced a convenient height for a workman above the floor, a plurality of units mounted on said horizontal supporting surface of said table structure for locating the members of a truss and also for locating nailing plates to be driven upward into truss members at intersections thereof, said units being of substantially identical construction and each comprising a bottom plate for mounting the unit on the supporting surface and side plates extending upward from the sides of the bottom plate, each unit having guides attached to the inner surfaces of the side plates, a locator tray with each unit having an upper surface substantially in a horizontal plane for holding a nailing plate in position to be driven into the intersection of truss members positioned thereabove, each locator tray having a sliding connection with the guides of its unit for vertical movement of the tray and nailing plates relative to the unit bottom plate, and each unit having three channels at the upper ends of the side plates, said channels opening outwardly to the sides of the units and having their upper sides positioned above the plane of the locator tray upper surface for supporting truss members above the locator tray, means attached to said channels for locating a truss member relative to the unit, means for locating truss members relative to the units comprising a plurality of pins for mounting on said unit channels with an end of the pins projecting above the plane of said locating tray, and a locator bar having collars attached to each of its ends, the collars being mountable on said pins for holding the locator bar on said pedestals.

15. Apparatus for fabricating wood trusses as set forth in claim 14 wherein one end portion of the locator bar is inclined relative to the other end portion whereby two truss members may be aligned at an angle to each other along opposite end portions of the locator bar.

16. Apparatus for fabricating wood trusses as set forth in claim 14 wherein the locator bar has an elongate straight surface extending from one end to the other end of the bar for alignment along said surface of two truss members positioned in end-to-end relation.

17. Apparatus comprising table structure providing a supporting surface in a horizontal plane spaced a convenient height for a workman above the floor, a plurality of units mounted on said horizontal supporting surface of said table structure for locating the members of a truss and also for locating nailing plates to be driven upward into truss members at intersections thereof, said units being of substantially identical construction and each comprising a bottom plate for mounting the unit on the supporting surface and side plates extending upward from the sides of the bottom plate, each unit having guides attached to the inner surfaces of the side plates, a locator tray with each unit having an upper surface substantially in a horizontal plane for holding a nailing plate in position to be driven into the intersection of truss members positioned thereabove, each locator tray having a sliding connection with the guides of its unit for vertical movement of the tray and nailing plates relative to the unit bottom plate, and each unit having three channels at the upper ends of the side plates, said channels opening outwardly to the sides of the units and having their upper sides positioned above the plane of the locator tray upper surface for supporting truss members above the locator tray, means attached to said channels for locating a truss member relative to the unit comprising a plurality of pins for mounting on said unit channels with an end of the pins projecting above the plane of said locating tray, and a peak splice locator assembly having means for adjustably mounting said assembly along one of said unit channels, said assembly having a bar mounted for swinging movement relative to said units.

18. Apparatus for fabricating wood trusses as set forth in claim 17 wherein said assembly further comprises a rod, rod supports mounting said rod for rotation about its axis, said rod supports being adjustably connected to said unit channel, and means attaching one end of said bar to said rod for swinging movement with said rod about its axis of rotation.

19. Apparatus for fabricating wood trusses having lower chords, upper chords intersecting each other at the peak of the truss and intersecting the lower chords at the heels of the truss, and web members between the upper and lower chords, the cords and web members being secured together at intersections thereof by nailing plates, the apparatus comprising a plurality of substantially identical units, one of the units being located for supporting the upper chords at the peak of the truss, two of the units being located for supporting upper and lower chords at the heels of the truss and other of the units being located for supporting truss chords and web members where they intersect at intermediate locations along the upper and lower chords, a plurality of tables separate from the units and spaced from each other for supporting the units at a convenient work height, each table having a top surface in a substantially horizontal plane on which the units are mounted, a pair of spaced rails beneath said tables, the tables being adjustable along the rails and having clamps for fixing the tables relative to the rails, each of the units having a bottom plate, each table top surface being substantially larger than the unit bottom plate and having an elongate channel, fasteners adjustably positioned in said channels and connected to said bottom plates for adjustably attaching each unit to its supporting table, the units each having a locator tray with a substantially horizontal upper surface for holding nailing plates in position to be driven into the intersection of chords and web members positioned thereabove, means mounting each tray for vertical movement relative to its bottom plate, and a plurality of pins and clamps mounted on the units for positioning truss chords and web members on the units.

20. Apparatus for fabricating wood trusses as set forth in claim 19 wherein there are five of said tables, two of said tables being at the heels of the truss, one of said tables being at the peak of the truss, and the other two tables being between the truss peak and heels at the intersection of web members and the chords.

21. Apparatus for fabricating wood trusses as set forth in claim 20 wherein the two tables at the heels of the truss are of the same size and construction, and the two tables at the intersection of the web members and chords are of the same size and construction.

22. Apparatus for fabricating wood trusses as set forth in claim 20 further including two additional tables of like construction positioned between the tables at the truss heels and the tables beneath the interesctions of web members and chords.

23. Apparatus for fabricating wood trusses having lower chords, upper chords intersecting each other at the peak of the truss and intersecting the lower chords at the heels of the truss, and web members between the upper and lower chords, the chord and web members being secured together at intersections thereof by nailing plates; the apparatus comprising a plurality of identical units, one of the units being located for supporting the upper chords at the peak of the truss, two of the units being located for supporting upper and lower chords at the heels of the truss, and other of the units being located for supporting truss chords and web members where they intersect at intermediate locations along the upper and lower chords, a single table separate from the units supporting all of the units, each of the units having a bottom plate, said table having a top surface in a substantially horizontal plane for supporting the units at a convenient work height, said table having on said top surface two elongate channels at right angles to each other, fasteners adjustably positioned in said channels and connected to some of said unit bottom plates for adjustably and temporarily attaching said units to the supporting table, each unit having a locating tray for holding nailing plates in position to be driven into the intersection of chords and web members positioned thereabove, means mounting each tray for vertical movement relative to its bottom plate, and a plurality of pin and clamps mounted on the units for positioning truss chords and web members on the units.

24. Apparatus for fabricating wood trusses as set forth in claim 23 wherein two of said units are attached directly to the top of said table in spaced relation to said channels.

25. Apparatus for fabricating wood structures having chord and web members secured together at intersections thereof by nailing plates; the apparatus comprising a plurality of substantially identical units located for supporting the chord and web members of the wood structure, each of the units having a bottom, a surface for supporting the units, fasteners for adjustably and temporarily attaching said units to the supporting surface, each unit having a locating tray for holding nailing plates in position to be driven into the intersection of chord and web members positioned thereabove, means mounting each tray for vertical movement relative to its bottom plate, and a plurality of pins and clamps mounted on the units for positioning chord and web members on the units.

26. Apparatus as set forth in claim 25 wherein the fasteners comprise double-headed nails, and the bottom of each unit has holes through which the nails are driven for attaching the units to the supporting surface.

27. Apparatus as set forth in claim 25 wherein the fasterners comprise magnets attached to the bottom of the units, and the supporting surface is a metallic member.

28. Apparatus as set forth in claim 25 wherein the fasteners comprise suction cups attached to the bottom of the units.

References Cited

UNITED STATES PATENTS 3,068,484  12/1962  Moehlenpah et al. ___ 227—152
3,241,585  3/1966  Jureit.

WILLIAM W. DYER, Jr., *Primary Examiner.*

GRANVILLE Y. CUSTER, Jr., *Examiner.*